(12) United States Patent
Mitrov (10) Patent No.: US 7,624,144 B1
(45) Date of Patent: Nov. 24, 2009

(54) SYSTEM AND METHOD FOR REDUCING DATA TRAFFIC ASSOCIATED WITH A MESSAGING SERVICE IN A CLUSTERED SERVER ENVIRONMENT

(75) Inventor: Vesselin P. Mitrov, Sofia (BG)

(73) Assignee: SAP AG, Walldorf (DE)

( * ) Notice: Subject to any disclaimer, the term of this patent is extended or adjusted under 35 U.S.C. 154(b) by 806 days.

(21) Appl. No.: 10/836,504

(22) Filed: Apr. 29, 2004

(51) Int. Cl.
*G06F 15/173* (2006.01)
*G06F 15/16* (2006.01)

(52) U.S. Cl. .................. 709/203; 709/226; 709/206

(58) Field of Classification Search ............... 709/226
See application file for complete search history.

(56) References Cited

U.S. PATENT DOCUMENTS

2003/0163761 A1* 8/2003 Chen et al. .................. 714/10
2004/0025169 A1* 2/2004 Wiser et al. ................. 719/315

OTHER PUBLICATIONS

Sun Microsystems, Inc., "The JMS API Programming Model", Java™ Message Service Tutorial, pp. 1-10, 2002, printed on Jun. 9, 2002, http://java.sun.com/products/jms/tutorial/1_3_1-fcs/doc/prog_model.html.

http://e-docs.bea.com/wls/docs70/ejb/message_beans.html, Dec. 2003—printed Jul. 22, 2004 (Technology Documentation of WebLogic Application Server, 33 pages).

* cited by examiner

*Primary Examiner*—William C Vaughn, Jr.
*Assistant Examiner*—Joiya M Cloud
(74) *Attorney, Agent, or Firm*—Schwegman, Lundberg & Woessner, P.A.

(57) ABSTRACT

A system and method are described for reducing messaging data traffic within a cluster of servers. According to one embodiment, each server within the cluster initially attempts to register as a message listener for a particular messaging destination (e.g., JMS Topic). After one server successfully registers, a locking service locks out all other servers from registering as listeners. Subsequently, any messages directed to the messaging destination are forwarded only to the registered server and not the other servers in the cluster, thereby reducing messaging data traffic. If the registered server becomes inoperative, the cluster is notified and the other servers again attempt to register. The first to successfully register is again identified as the listener for the cluster.

14 Claims, 6 Drawing Sheets

SYSTEM AND METHOD FOR REDUCING DATA TRAFFIC ASSOCIATED WITH A MESSAGING SERVICE IN A CLUSTERED SERVER ENVIRONMENT

BACKGROUND

1. Field of the Invention

This invention relates generally to the field of data processing systems. More particularly, the invention relates to a system and method for reducing data traffic associated with a messaging service within a cluster of network servers.

2. Description of the Related Art

Multi-Tier Enterprise Computing Systems

Java 2 Enterprise Edition ("J2EE") is a specification for building and deploying distributed enterprise applications. Unlike traditional client-server systems, J2EE is based on a multi-tiered architecture in which server side program code is divided into several layers including a "presentation" layer and a "business logic" layer.

Figure 1:
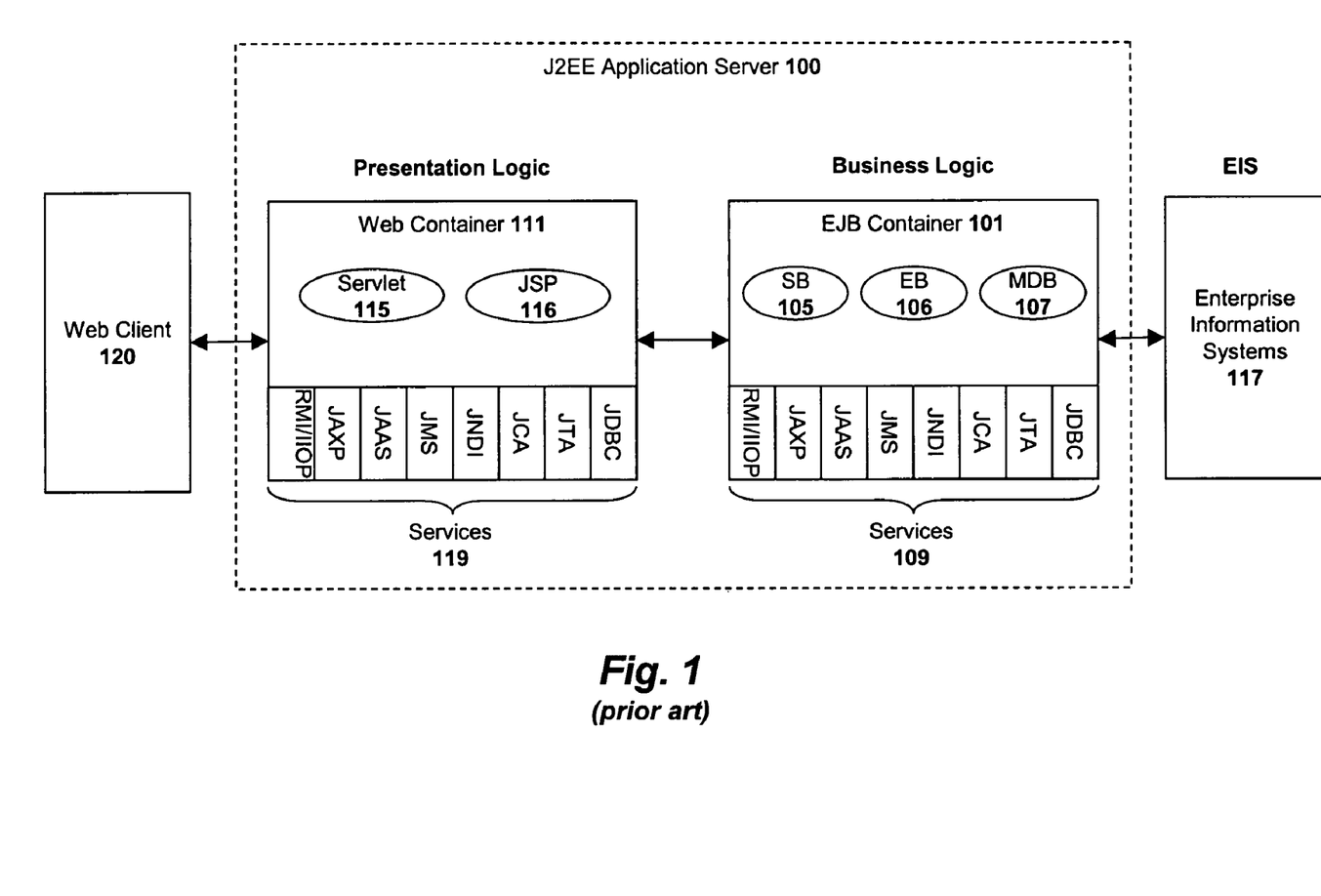
FIG. 1 illustrates several layers within an exemplary J2EE architecture.

FIG. 1 illustrates an exemplary J2EE application server 100 in which the presentation layer is implemented as a Web container 111 and the business layer is implemented as an Enterprise Java Bean ("EJB") container 101. Containers are runtime environments which provide standard common services 119, 109 to runtime components. For example, the Java Naming and Directory Interface ("JNDI") is a service that provides application components with methods for performing standard naming and directory services. Containers also provide unified access to enterprise information systems 117 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 1, each layer of the J2EE architecture includes multiple containers. The Web container 111, for example, is itself comprised of a servlet container 115 for processing servlets and a Java Server Pages ("JSP") container 116 for processing Java server pages. The EJB container 101 includes three different containers for supporting three different types of enterprise Java beans: a session bean container 105 for session beans, a entity bean container 106 for entity beans, and a message driven bean container 107 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

JMS and Message Driven Beans

The Java Messaging Service ("JMS") allows applications to communicate with one another by exchanging asynchronous messages. As a result, different applications from potentially different vendors are able to interact within a distributed network environment.

Figure 2A:
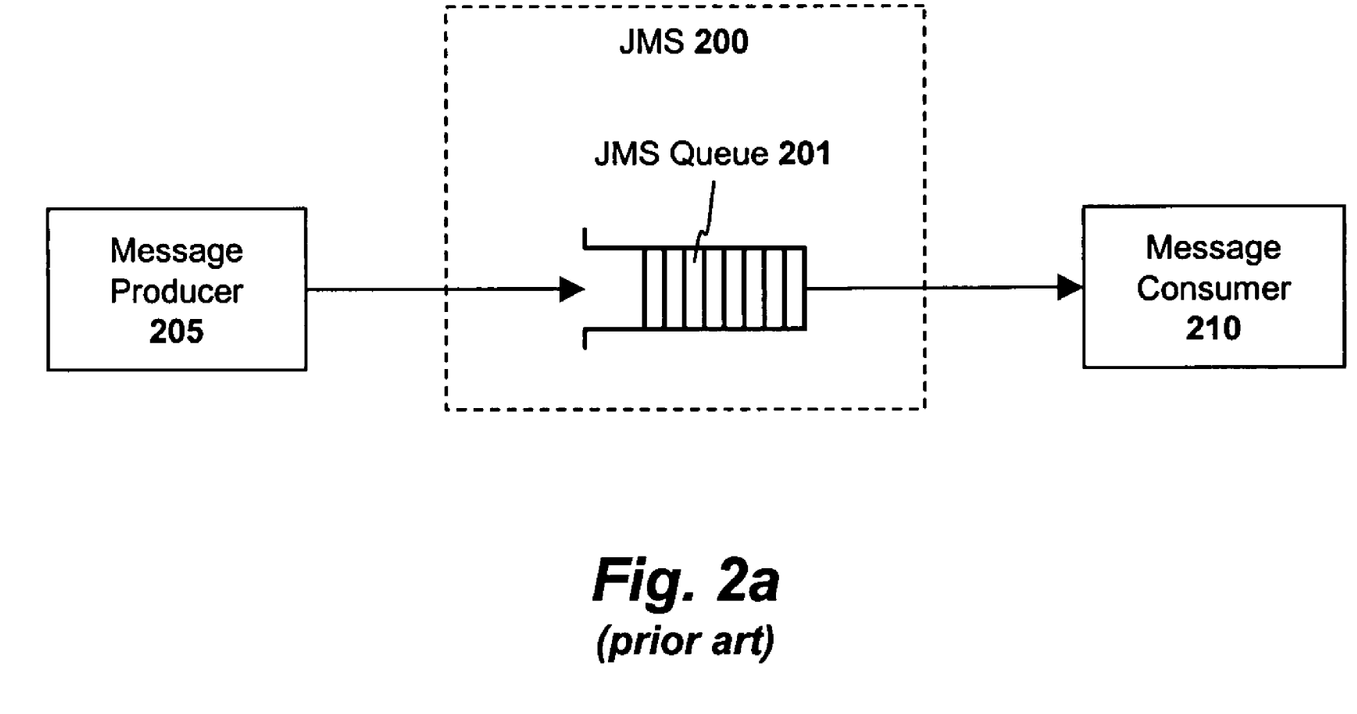
FIG. 2a illustrates a prior art message producer, a message consumer, and a JMS queue.

Two messaging models are supported by JMS: a point-to-point model and a publish-and-subscribe model. The point-to-point model is used for one-to-one delivery of messages between two applications. As illustrated in FIG. 2a, an application that sends a message, referred to as a message sender 205, emits messages to a specific message queue 201 on the java messaging service 200. The queue 201 is maintained for a specific message receiver 210 which periodically polls the queue 201 to check for new messages. In the point-to-point model, a queue may have more than one producer and more than one consumer, but only one consumer may consume each message. Once consumed, a message is automatically removed from the queue 201.

Figure 2B:
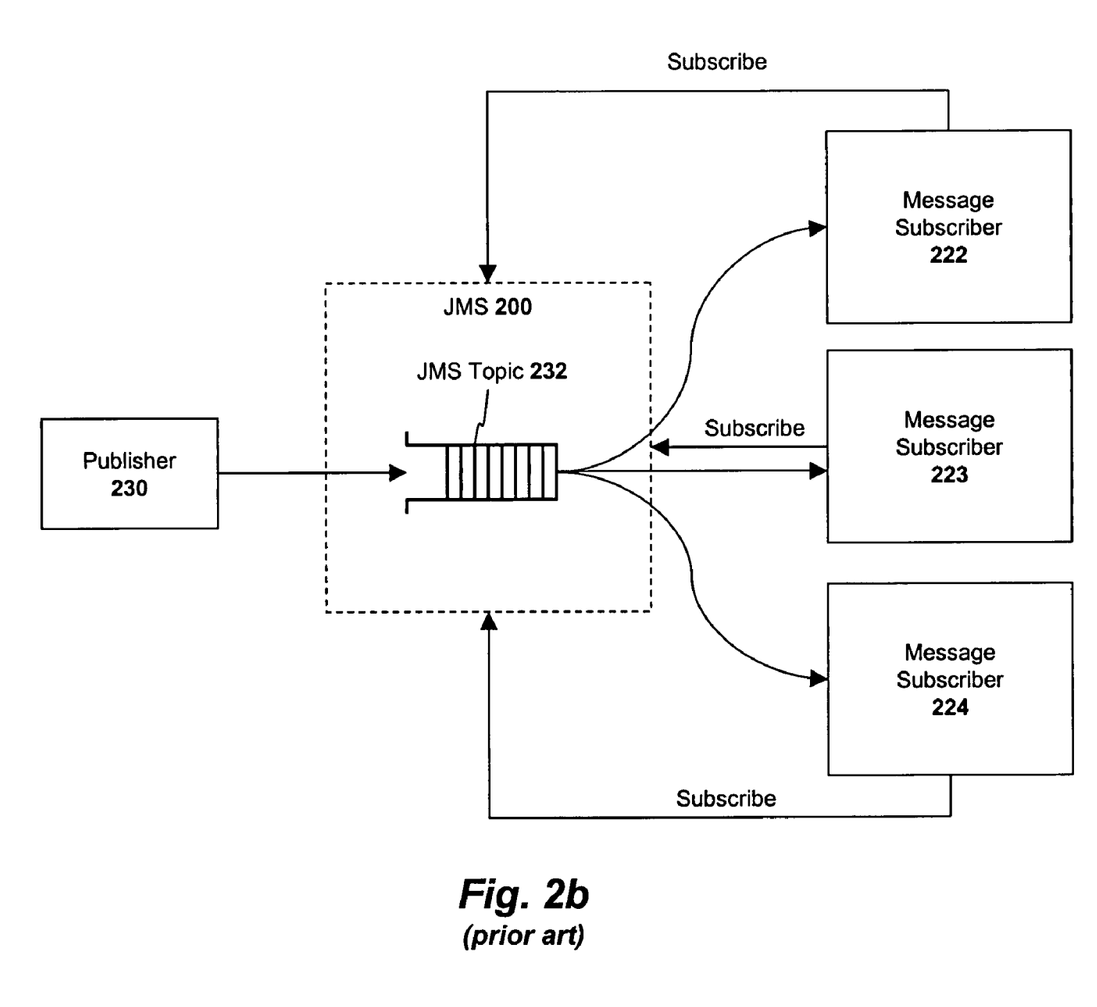
FIG. 2b illustrates a prior message publisher, a plurality of message subscribers and a JMS topic.

In contrast, the publish-and-subscribe model is based on the one-to-many broadcast of messages and is build around the concept of a message "topic" 232 as illustrated in FIG. 2b. Each message broadcast to a topic is transmitted to all subscribers 222-224 to that topic. Topics are typically grouped into hierarchies and subscribers may be configured to subscribe to different branches of the hierarchy. In addition, a message subscriber may be configured as a "durable" subscriber which can disconnect from the topic and later reconnect to retrieve the messages that it subscribed to.

Message driven beans ("MDBs") 107 are asynchronous message consumers or subscribers. As mentioned above, MDBs are managed by an EJB container 101 of the J2EE server 100 (or, more specifically, by the MDB container 107). To receive messages from a particular queue or topic, the EJB container 101 registers itself with the JMS service as a listener for the queue or topic. The EJB container 101 then invokes an MDB in response to the arrival of each new JMS message for which it is registered as a listener.

One problem which exists with the foregoing configuration is that, if one active EJB container exists on each server node in a large cluster, and if all EJB containers register as listeners for a particular topic, then each message will be sent and received as many times as there are severs in the cluster. One problem with this scenario is that the receiving the message multiple times may confuse the logic of the overall application. For instance, if the application performs some database operations when it receives a message (e.g., an insert or update in the database), and the message is received more than once, serious data conflict problems may result. MDBs assume that each message will be received only once, so what is needed are techniques which may be employed within a large enterprise network to ensure this functionality.

SUMMARY

A system and method are described for reducing messaging data traffic within a cluster of servers. According to one embodiment, each server within the cluster initially attempts to register as a message listener for a particular messaging destination (e.g., JMS Topic). After one server successfully registers, a locking service locks out all other servers from registering as listeners. Subsequently, any messages directed to the messaging destination are forwarded only to the registered server and not the other servers in the cluster, thereby reducing messaging data traffic. If the registered server becomes inoperative, the cluster is notified and the other servers again attempt to register. The first to successfully register is again identified as the listener for the cluster.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for reducing data traffic associated with a messaging service in a clustered server environment. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

An Exemplary Network Architecture

Figure 3:
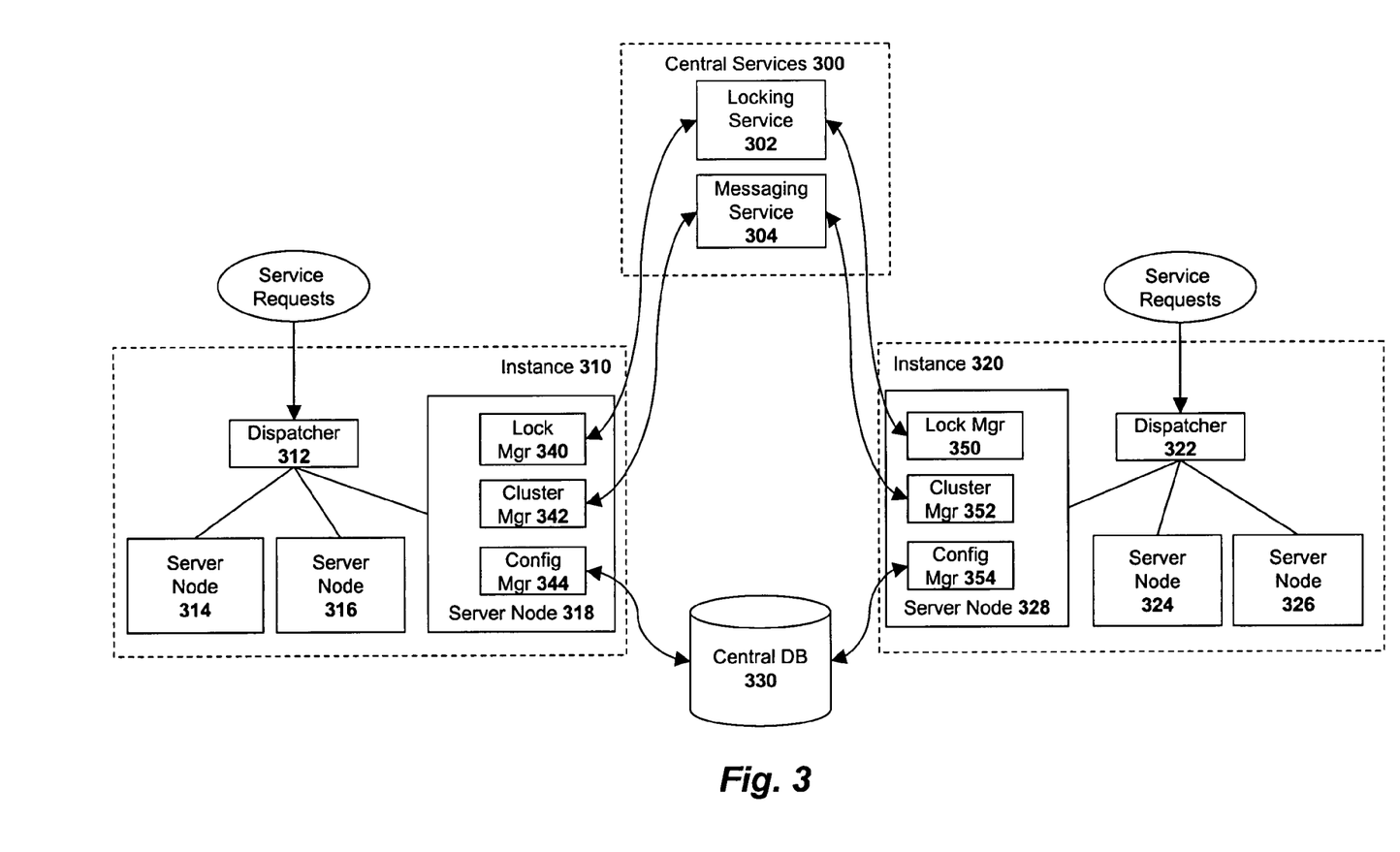
FIG. 3 illustrates a clustered server architecture on which embodiments of the invention are implemented.

A system architecture according to one embodiment of the invention is illustrated in FIG. 3. The architecture includes a central services instance 300 and a plurality of application server instances 310, 320. As used herein, the application server instances, 310 and 320, each include a group of server nodes 314, 316, 318 and 324, 326, 328, respectively, and a dispatcher, 312, 222, respectively. The central services instance 300 includes a locking service 302 and a messaging service 304 (described below). The combination of all of the application instances 310, 320 and the central services instance 300 is referred to herein as a "cluster." Although the following description will focus solely on instance 310 for the purpose of explanation, the same principles apply to other instances such as instance 320.

The server nodes 314, 316, 318 within instance 310 provide the business and/or presentation logic for the network applications supported by the system. Each of the server nodes 314, 316, 318 within a particular instance 310 may be configured with a redundant set of application logic and associated data. In one embodiment, the dispatcher 310 distributes service requests from clients to one or more of the server nodes 314, 316, 318 based on the load on each of the servers. For example, in one embodiment, the dispatcher 310 implements a round-robin policy of distributing service requests.

In the description that follows, the server nodes 314, 316, 318 are Java 2 Enterprise Edition ("J2EE") server nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 310, 320 is enabled via the central services instance 300. As illustrated in FIG. 3, the central services instance 300 includes a messaging service 304 and a locking service 302. The message service 304 allows each of the servers within each of the instances to communicate with one another via a message passing protocol. For example, messages from one server may be broadcast to all other servers within the cluster via the messaging service 304 (e.g., such as the cache configuration messages described below). Alternatively, messages may be addressed directly to specific servers within the cluster (i.e., rather than being broadcast to all servers).

It should be noted that the messaging service 304 of one embodiment of the invention is different from the JMS messaging service 400 described below. The first is used for basic internal communication between servers in the cluster, and the second is used to enable communication between different deployed applications, as described herein.

In one embodiment, the locking service 302 disables access to (i.e., locks) certain specified portions of configuration data and/or program code stored within a central database 330. The locking manager locks data on behalf of various system components which need to synchronize access to specific types of data and program code (e.g., such as the configuration managers 344, 354 illustrated in FIG. 3). Moreover, the locking service enables a distributed caching architecture in which copies of configuration data are cached locally at servers/dispatchers. In addition, as described in greater detail below, in one embodiment, the locking service 302 is used to prevent certain JMS message listeners from registering when another message listener is already registered for a particular JMS destination (i.e., topic or queue).

In one embodiment, the messaging service 304 and the locking service 302 are each implemented on dedicated servers. However, the messaging service 304 and the locking service 302 may be implemented on a single server or across multiple servers while still complying with the underlying principles of the invention.

As illustrated in FIG. 3, each server node (e.g., 318, 328) includes a lock manager 340, 350 for communicating with the locking service 302; a cluster manager 342, 352 for communicating with the messaging service 304; and a configuration manager 344, 354 for communicating with a central database 330 (e.g., to store/retrieve configuration data as described herein). Although the lock-manager 340, 350, cluster manager 342, 352 and configuration manager 344, 354 are illustrated only with respect to server nodes 318 and 328 in FIG. 3, each of the server nodes 314, 316, 324 and 326 and/or on the dispatchers 312, 322 may be equipped with equivalent lock managers, cluster managers and configuration managers.

Embodiments of the Invention

In one embodiment of the invention, only one EJB container is registered as a message listener for each JMS topic at any given time. At startup, all EJB containers attempt to register themselves but only the first EJB container to attempt is registered with the JMS topic. Subsequently, if the first EJB container is halted for some reason (e.g., if the server node is taken down), the other EJB containers will again attempt to register as listeners for the JMS topic(s) and, once again, no other EJB containers are permitted to register following the first EJB container to successfully register. As a result, each message is received only once, by the registered EJB container (rather than a number of times equal to the number of servers in the cluster), thereby significantly reducing messaging traffic over the cluster. As described below, synchronization between each of the nodes in the cluster may be accomplished by way of the locking service 302 and/or the messaging service 304 of the central services instance 300.

Figure 4:
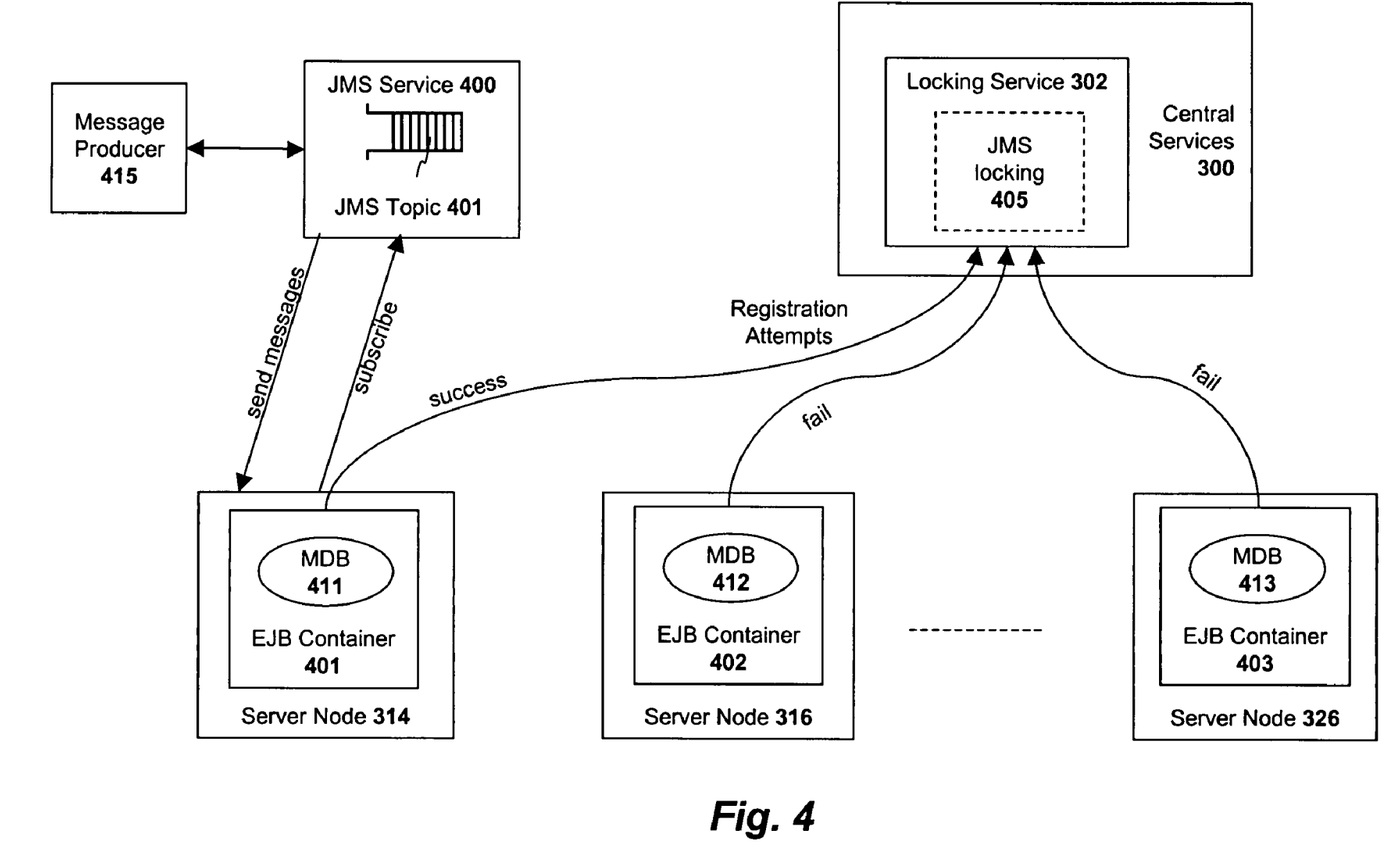
FIG. 4 illustrates one embodiment of a system in which EJB containers attempt to register as listeners for a certain topic.

FIG. 4 illustrates one embodiment in which the JMS service 400 operates in combination with the locking service 302. As illustrated, each EJB container 401-403 initially attempts to register each of its message driven beans ("MDBs") as a listener for each JMS topic 401. The locking service 302 includes a JMS locking module 405 that maintains an up-to-date list of the EJB containers/MDBs that are registered as listeners for each of the topics 401. Each container 401, 402, 403 attempts to register as a listener by passing its jndiName to the locking service 302. The locking service 302 determines, based on its list of registered listeners, whether a current MDB listener already exists for the JMS topic 401. If so, then the locking service 302 throws an exception, thus preventing the requesting EJB container/MDB from trying to register as a listener for the topic 401. However, if no current listener exists, then the requesting EJB container/MDB is allowed to try to register itself as a listener in the JMS service 400 for the topic 401 and a lock is placed on the topic within the topic registry locks 405. Thus only one of the containers (EJB Container/MDB 401 on FIG. 4) will try to register itself in the JMS service and it will be the only MDB which will receive messages from this Topic.

Figure 5:
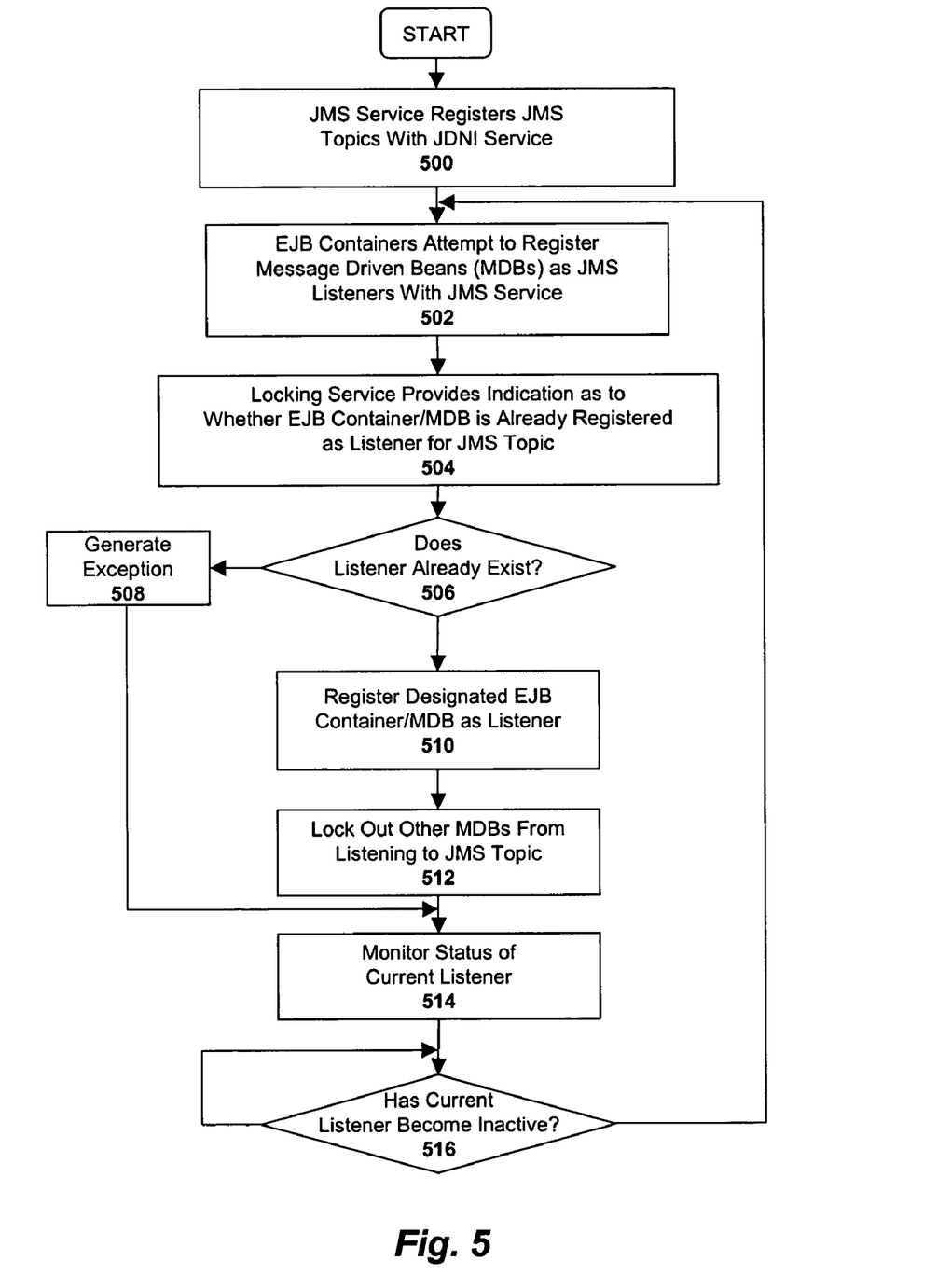
FIG. 5 illustrates one embodiment of a method in which EJB containers attempt to register as listeners for certain queues and/or topics.

One embodiment of a method for registering EJB containers as JMS listeners is illustrated in FIG. 5. When the system is started, the JMS service 400 registers its JMS topics (e.g., topic 401) with the Java Naming and Directory Interface Service ("JNDI") 410. As mentioned above, JNDI provides applications with standard conventions for naming and directory services. Once the JMS topics are registered with JNDI 410, message producers 415 (e.g., applications) use JNDI to locate the JMS topics associated with different MDBs. Various other types of naming and directory interfaces may be employed while still complying with the underlying principles of the invention.

At 502, EJB containers 401-403 within the cluster attempt to register MDBs 411-412 as listeners for the JMS topic 401. At 504, the locking service 302 provides an indication as to whether MDB listeners already exist for each of the JMS topics (i.e., whether the JMS topics are "locked"). In one embodiment, each MDB is identified by the locking service 302 based on the unique JNDI name assigned to the EJB. For example, the JMS locking module 405 may maintain its list of locks using a JNDI name to identify each MDB.

If an MDB listener already exists for a particular topic, determined at 506, then the locking service 302 generates an exception at 508 and the requesting EJB container/MDB is not registered as a listener. If an MDB listener does not exist, then, at 510, the MDB within the requesting EJB container is registered by the JMS service 400 as the listener for the JMS topic 401. In addition, at 514, the JMS locking module 405 locks out any other EJB containers from registering their EJBs as listeners for the JMS topic 401. To do so, the JMS locking module 405 may store the JNDI name of the requesting EJB and/or the JMS topic 401 within its list.

As a result, messages sent to the JMS topic 401 by message producers 415 will be received by only the MDB/container registered as the listener for the cluster, thereby significantly reducing the network traffic that would result if all MDBs were registered (i.e., in which case the same messages would be transmitted to every EJB container in the cluster) and preventing application problems that might result from multiple message transmission. After the MDB is registered, when a message producer 415 sends a message to the topic for which the MDB is a listener, the EJB container chooses from one of the method-ready instances of the MDB and invokes the onMessage( ) method of the MDB. The information provided within the message (e.g., data objects, XML code, etc) is then processed by the chosen message-driven bean instance.

At 514, the status of each of the current set of listeners is continually monitored by the JMS service 400 or an external monitoring service. At 516, if a listener becomes inactive for one reason or another (e.g., because the listener's server node is taken down), then the process starts over again from 502 as other EJB containers attempt to register their MDBs for each JMS topic. Again, in one embodiment of the invention, only one EJB container will be permitted to register.

Various different mechanisms may be employed to identify when an MDB listener has become "unavailable." For example, if the server on which the MDB container is executed is manually shut down, it may provide an active notification to other servers in the cluster via central services 300. Alternatively, the central services instance 300 (or other central management service) may periodically poll each of the server nodes to ensure that they are active. Other server nodes may then be notified upon detecting that the server on which an MDB listener resides is inactive.

In one embodiment, a Java Management Extensions ("JMX") architecture is employed to monitor EJB container resources such as MDBs within the server nodes. According to the JMX architecture, a specific type of enterprise java bean known as a management bean ("MBean") is employed to monitor different resources within the system. The management beans may be configured to generate active notifications to the JMS service 400 and/or the locking service 302 in response to changes in the status of the MDBs that they monitor. For example, if a particular MDB is disabled, the MBean associated with that resource may provide a notification to the JMS service 400, which may then allow another MDB to be registered as a listener. It should be noted, however, that the underlying principles of the invention are not limited to any particular monitoring/management software architecture.

One embodiment of the JMS service 400 supports both persistent and non-persistent delivery of messages. The delivery mode may be specified by the message producer 415, for example, by specifying a Delivery Mode variable contained within the JMS message. If a persistent delivery mode is set, then the message for a particular topic may be stored to non-volatile storage such as a hard drive (e.g., the central database 330) prior to being transmitted to the message listener. By contrast, if a non-persistent delivery mode is set, then the message does not need to be stored to non-volatile memory prior to transmission.

While messages directed to JMS topics may be processed as described above, in one embodiment of the invention, multiple containers/MDBs are permitted to register as listeners for particular JMS queues. No locking techniques are employed for queues because when a message is received by a queue, only one of the registered listeners may be notified (i.e., this is typical behavior for a queue, so no additional processing is required).

Embodiments of the invention may include various steps as set forth above. The steps may be embodied in machine-executable instructions which cause a general-purpose or special-purpose machine, such as a computer processor or virtual machine, to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, the present invention may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above focus on the Java Messaging Service as the messaging standard, the underlying principles of the invention may be employed in virtually any distributed messaging environment such as a Microsoft Message Queuing ("MSMQ") environment (e.g., within a .NET architecture).

Moreover, although the embodiments of the invention described above select a single MDB within an EJB container as a listener, alternate implementations are also possible. For example, rather than selecting a single EJB container from within a cluster of N EJB containers multiple, M EJB containers may be selected where M<N. As long as the number selected is less than the total number, messaging traffic will be reduced.

Finally, although the particular JMS locking module 405 employs a "list" of MDBs and/or JMS topics to lock out other MDBs/topics, various other well known data structures and/or locking mechanisms may be employed (e.g., such as a relational database).

Accordingly, the scope and spirit of the invention should be judged in terms of the claims which follow.

What is claimed is:

1. A method comprising:
processing program code with one or more computer processors to perform the following:
ensuring that an onMessage( ) method is invoked on only one message-driven bean (MDB) instance within a server cluster for a message directed to a particular Java Messaging Service (JMS) topic destination within a publish-and-subscribe model, by performing the following:
receiving a request from a server within a server cluster, the server having a first bean container capable of containing a plurality of message driver beans (MDB)s, the request to register the server as a message listener for a particular Java Message Service (JMS) topic destination within a publish-and-subscribe model;
determining that no other servers within the server cluster are registered as listeners for the particular JMS topic destination;
registering the server as the message listener for the JMS topic destination responsive to the request;
while the server is registered as the message listener for the JMS topic destination, locking out other servers in the cluster that send requests to be registered as message listeners for the JMS topic destination, forwarding a message for the JMS topic destination to the server and processing the message by invoking an onMessage( ) method on an MDB instance within the server; and,
in response to the server becoming inoperative:
selecting one of the other servers within the cluster as the registered server for the JMS topic destination; and,
forwarding a subsequent message for the JMS topic destination to the other servers and processing a second subsequent message for the JMS topic destination by invoking an onMessage( ) method on another MDB instance within the other servers.

2. The method as in claim 1 wherein the server comprises an enterprise java bean ("EJB") container and wherein the MDB instance within the server is within the EJB container; and,
wherein the other server within the cluster comprises a second EJB container, and the other MDB instance within the other server is within the second EJB container.

3. The method as in claim 2 further comprising:
receiving respective requests from a plurality of servers within the server cluster to register as message listeners for a particular JMS queue for point-to-point model JMS messages; and
allowing each of the plurality of servers to register as message listeners for the JMS queue.

4. The method as in claim 3 further comprising:
maintaining a list of registered entities for each JMS topic destination, each of said entities being one of:
a specific server;
a specific EJB container;
a specific MDB instance.

5. The method as in claim 3 wherein the response to the first server being inoperative further comprises:
each of the other servers within the cluster sending its respective jndiName to a locking service that performs the locking.

6. The method as in claim 5
further comprising registering JMS topic destinations with a JNDI service within the cluster.

7. The method as in claim 3 wherein a JMS messaging service for said cluster performs said forwarding of said subsequent message and a locking service for said cluster performs said locking out of said other servers.

8. An article of manufacture including program code stored on a tangible computer readable storage medium which, when read from memory and executed by one or more processors, causes the one or more processors to perform the operations of:
ensuring that an onMessage( ) method is invoked on only one message-driven bean (MDB) instance within a server cluster for a message directed to a particular Java Messaging Service (JMS) topic destination within a publish-and-subscribe model by performing the following:
receiving a request from a server within a server cluster, the sever having a first bean container capable of containing a plurality of message driver beans (MDB)s, the request to register the server as a message listener for a particular Java Message Service (JMS) topic destination within a publish-and-subscribe model;
determining that no other servers within the server cluster are registered as listeners for the particular JMS topic destination;
registering the server as the message listener for the JMS topic destination responsive to the request;

while the server is registered as the message listener for the JMS topic destination, locking out other servers in the cluster that send requests to be registered as message listeners for the JMS topic destination, forwarding a message for the JMS topic destination to the server and processing the message by invoking an onMessage( ) method on an MDB instance within the server; and, in response to the server becoming inoperative:

selecting one of the other servers within the cluster as the registered server for the JMS topic destination; and, forwarding a subsequent message for the JMS topic destination to the other server and processing a second subsequent message for the JMS topic destination by invoking an onMessage( ) method on another MDB instance within the other servers.

9. The article of manufacture as in claim 8 wherein the server comprises an enterprise java bean ("EJB") container and wherein the MDB instance within the server is within the EJB container; and, wherein the other servers within the cluster comprises a second EJB container, the MDB instance within the other server is within the second EJB container.

10. The article of manufacture as in claim 9 comprising additional program code to cause the one or more processors to perform the operations of:

receiving respective requests from a plurality of servers within the server cluster to register as message listeners for a particular JSM queue for point-to-point model JMS messages; and allowing each of the plurality of servers to register as message listeners for the JMS queue.

11. The article of manufacture as in claim 10 comprising additional program code to cause the one or more processors to perform the operations of:

maintaining a list of registered entities for each JMS topic destination, each of said entities being one of:

a specific server;

a specific EJB container;

a specific MDB instance.

12. The article of manufacture as in claim 10 comprising additional program code to cause the one or more processors to perform the operations of:

in response to the server being inoperative:

each of the other servers within the cluster sending a respective jndiName to a locking service that performs the locking.

13. The article of manufacture as in claim 12 wherein the method further comprises registering JMS topic destinations with a JNDI service within the cluster.

14. The article of manufacture as in claim 10 wherein:

a JMS messaging service for said cluster performs said forwarding of said subsequently received message and a locking service for said cluster performs said locking out of the other servers.

* * * * *

UNITED STATES PATENT AND TRADEMARK OFFICE
CERTIFICATE OF CORRECTION

PATENT NO. : 7,624,144 B1  Page 1 of 1
APPLICATION NO. : 10/836504
DATED : November 24, 2009
INVENTOR(S) : Vesselin P. Mitrov It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Twenty-sixth Day of October, 2010

David J. Kappos
*Director of the United States Patent and Trademark Office*